2,767,158
Patented Oct. 16, 1956

2,767,158

EPOXIDE RESINS CURED BY ALCOHOLATES OF POLYVALENT METALS

Felix Schlenker and Hans Starck, Wiesbaden, Germany, assignors to Chemische Werke Albert, Wiesbaden-Kastel (Amoneburg), Germany, a corporation of Germany No Drawing. Application May 28, 1952,
Serial No. 290,574

Claims priority, application Germany May 31, 1951

10 Claims. (Cl. 260—47)

This invention relates to epoxide resins and processes of producing the same. More particularly, it relates to epoxide resins containing novel curing or hardening agents which may be described as alcoholates of polyvalent metals. Since the final or thermoset resins produced from the epoxide resins containing the new hardening agents possess superior properties, the final resins produced as well as the intermediate thermoplastic resins are included within the scope of the invention defined and claimed herein.

It is known that compounds of the type of epoxide resins, which contain more than one ethylene oxide group in the molecule can be converted by curing into insoluble and infusible products in the presence of certain catalysts. This curing process is different from that of the known phenoplasts and aminoplasts due to the fact that volatile reaction products are not evolved during curing. Therefore, in the application of such resins to protective coatings, particularly dense pore-free films are obtained, and in their use by casting, completely homogeneous, bubble-free end products result.

As catalysts for this curing or polymerization process, numerous compounds have been suggested, such as inorganic and organic substances of basic character and anhydrides of polybasic carboxylic acids, which latter compounds react with the epoxide resins (derived by the reaction of polyhydric phenols and epichlorhydrin) and form polyesters showing strong net formation.[1] As known examples of the group of basic compounds, the following may be mentioned: hydroxides of the alkali and the alkaline earth groups, amines, such as diethylamine or piperidine, oxy-amines such as triethanolamine; furthermore cyanamide and its polymerization products and polyamines of varied character. As to the polybasic acid anhydrides, the following have heretofore been described among others: phthalic acid anhydride, maleic acid anhydride and derivatives obtained therefrom by diene synthesis.[2]

However, in spite of their variety, the hitherto known curing agents still have a series of disadvantageous properties which stand in the way of a wider application of epoxide resins in industrial fields. Known solid resins and solutions containing epoxide resins and curing agents can be stored for a short time only, for they react prematurely with each other and as a result become difficultly soluble prior to their intended application or they melt at too high temperatures. They may become strongly discolored during curing and make it impossible to obtain products of very light color, or the films formed by heating at higher temperatures may have serious surface defects, which tendency limits their usefulness in the lacquer industry.

An object of the present invention is to produce epoxide resins having excellent hardening properties. Another object is to produce thermoplastic epoxide resins which may be stored for considerable periods without loss of thermoplastic properties but when thereafter applied, readily convert to the final set, hard condition.

Other objects are to provide final thermoset ethoxyline resins which are distinguished by their light color and which possess excellent resistance to solvents.

Basically, the process of the instant invention may be considered as involving the incorporation in epoxide resins containing free epoxide groups, of alcoholates of polyvalent metals and specifically those capable of forming complex salts, the said epoxide resins being derived by the reaction of polyhydroxy phenols with epichlorhydrin. The presence of the alcoholate is considered to cause catalytic hardening through chemical combination.

The alcoholates can be incorporated in the epoxide resins by any suitable procedure but two methods described below are most effectively employed. In accordance with one procedure the admixture is accomplished simply by melting the epoxide resin in the presence of the alcoholate in which case care must be taken not to subject the resulting molten mass to a high temperature for a sufficient period of time as to cause reaction to occur and premature hardening to result. The other preferred method of incorporating the alcoholate involves first dissolving the same and then adding it to undiluted or dissolved epoxide resin. In both of the foregoing procedures the alcoholates are compatible with the epoxide resins either at once or after a short period of standing.

Although any number of solvents for the alcoholates may be employed, the nature of the solvent is important in obtaining best results. In accordance with a specific embodiment of the invention the solvent employed is composed of a beta-keto carboxylic acid ester of which ethyl acetoacetate is an example. This solvent is particularly effective in the production of ethoxyline resins produced for use as film bonding agents. The solvents of the above character lead to resins having several advantages such as faster curing, higher elasticity and faultless film surface. In place of the said ester there may be used in an analogous manner, similar esters of malonic acid and beta-diketones of which formylacetone is an example. The utilization of these solvents imparts stability to the metal alcoholates in the epoxide resin compositions.

Usable alcoholates are those of polyvalent metals such as cobalt, manganese, copper, zinc, aluminum, iron, titanium, tin and others with fluid mono- or divalent alcohols of the aliphatic, cycloaliphatic or aromatic series such as butyl-, amyl-, benzyl-, and cyclohexylalcohol, ethyleneglycol, polyethyleneglycols, monoether of ethyleneglycol and the like.

In accordance with an alternative embodiment of the present invention, the herein defined metal alcoholates may be utilized in the form of their alkoxo-salts, examples of which are copper-aluminum butylate, $$Cu(Al(OC_4H_9)_4)_2$$

cobalt-aluminum butylate, $Co(Al(OC_4H_9)_4)_2$, magnesium-aluminum butylate, $Mg(Al(OC_4H_9)_4)_2$ and similar compounds. These salts may be used as such or in solution in the same manner as the plain alcoholates.

In accordance with a still further embodiment of the invention, the alcoholates may be used in the form of synthetic resins formed by reaction of metal alcoholates of trivalent metals, such as for example, aluminum or ferricbutylate or similar alcoholates with compounds of tautomeric reaction capable of forming enolic or ketolic hydroxyl groups. These resins may be used either as ---
[1] Swiss Patent 211,116.
[2] Swiss Patent 251,647,  U. S. A. Patents 2,458,796, 2,528,359, 2,528,361, 2,511,913.

such or in dissolved condition. They can be altered before use by blowing the same with air or oxygen at elevated temperature. As examples of such synthetic resins, there may be mentioned those resins obtained by reaction of aluminum butylate or aluminum chloride with ethyl acetoacetate, esters of malonic acid, formylacetone or other compounds of tautomeric reaction and the resulting resins can be altered in various respects by after-treatment with oxygen.

The instant invention contemplates the utilization of not only the simple epoxide resins but also polyepoxy resins of various structures including those which in addition to their ethylene oxide groups contain also other functional groups such as phenolic and alcohol-OH groups. Such resins can be cured and hardened in the same manner as the simpler resins but the utilization of the metal alcoholates herein defined makes it possible to effect in very satisfactory manner mixed polymerization of polyepoxy resins with monoepoxy compounds, for example glycid phenyl ether. The process of the invention is therefore applicable to epoxide resins of the most varied character.

Films of faultless surface, high gloss, great hardness, excellent elasticity and unusually strong adherence to sheet iron and other surfaces are obtained by the application of the resins of the invention. Even under highest buckling stress, breaking of sheet iron occurs before the film adhering thereto is damaged. Furthermore, the coatings possess a high resistance to alkali. Even after a treatment of two hours in boiling five percent sodium hydroxide solution, the film is still completely undamaged, and it remains highly elastic. Finally, immersion during several days in a mixture of equal parts of benzene and ethanol with the addition of one percent water, leaves the film entirely unaffected and causes no rusting of the metal sheet under the film.

*Example 1*

Seventy-two parts by weight of an epoxide resin obtained in known manner from one mol of p,p'-dihydroxydiphenylpropane and two mols of 1,3-dichlorohydrin are mixed under thorough stirring with ten percent aluminumbutylate at 80° and the mixture is then cooled to room temperature.

By heating this combination of epoxide resin and alcoholate at 110–120° for two hours, an insoluble and infusible resin is formed. If surfaces of articles to be connected are coated with a uniform layer of this liquid resin-alcoholate combination, a very strongly adhering bond between the most varied materials can be obtained, without application of pressure. Therefore, this resin-alcoholate combination prepared without the use of solvents, can be used with particular advantage as an adhesive or cementing agent.

*Example 2*

Two hundred parts by weight of an epoxide resin prepared in conventional manner from p,p'-dihydroxydiphenyl propane, are dissolved in 200 parts by weight of ethylene glycol and is then mixed with forty parts by weight of a fifty percent ethylene glycol solution of aluminum butylate. A film prepared with this lacquer on sheet iron, yields a good, glossy coat of high hardness and elasticity after heating at 180° for 30 minutes.

*Example 3*

In the same manner as in Example 2, 400 parts by weight of a solution of equal parts of p,p'-dihydroxydiphenyl propane epoxide resin and ethylene glycol are mixed under stirring with 40 parts by weight of a solution of 20 parts by weight of aluminum butylate in 15 parts by weight of ethyl acetoacetate and 5 parts by weight of toluene. The resulting solution is used for coating sheet iron in several layers and each layer is heated at 180° for 30 minutes. A completely smooth film is thus obtained. This highly desirable result is in contrast to that which often occurs in the use of other curing agents, i. e. that the subsequent coats applied over prior cured coats do not form a satisfactory surface.

*Example 4*

An epoxide resin prepared from resorcinol and epichlorhydrine in conventional manner, is dissolved in a mixture of toluene and butanol (4:1 parts by volume) to provide a 60% solution. To this solution there is added 30% (based on the epoxide resin) of aluminumbutylate dissolved in the proportion of 1:1 in ethyl acetoacetate. By heating an initial coating on glass at 180° for 30 minutes and a second coating at 200° for 60 minutes, a very hard and elastic film is obtained.

*Example 5*

One hundred and twenty parts by weight of an epoxide resin from p,p'-dihydroxydiphenyl propane are dissolved in 120 parts by weight of glycid phenyl ether. To the solution, 24 parts by weight of a 50% aluminum-butylate solution in a mixture of ethyl acetoacetate and xylene are added and the mixture is kept at 150° until a highly viscous oil, just still capable of flowing, is formed. This mixed polymerized product, which is still soluble in conventional lacquer solvents, yields hard and elastic coatings upon heating.

*Example 6*

One hundred parts by weight of an epoxide resin of the type used in Example 1, are mixed with 25 parts by weight of a synthetic resin prepared by the reaction of 1000 parts by weight of aluminum butylate with 350 parts by weight of ethyl acetoacetate. The resin thus obtained has the same valuable properties as the product produced in Example 1.

*Example 7*

Twenty parts by weight of 62.5% solution of an epoxide resin in ethylene glycol are mixed with two parts of a solution of the cobalt salt of aluminum tetrabutoxyalkoxo acid in butanol, and after applying on a metal sheet is completely cured by heating at 100° for 30 minutes.

*Example 8*

One hundred parts of an epoxide resin obtained from one mol of p,p'-dihydroxydiphenylpropane and one and a half mol of epichlorhydrine are dissolved in one hundred parts of glycol monoalkylether and then mixed with 15.3 parts of a solution of ferric butylate stabilised with ethyl acetoacetate. By heating a coating at 200° C. for 30 minutes a complete cured and hardened film is obtained.

The stabilised solution of the ferric butylate is prepared by heating for 3 to 4 hours 1000 parts of ferric butylate with 472.3 parts of ethyl acetoacetate.

*Example 9*

Fifty parts of an epoxide resin as in Example 8 are dissolved in fifty parts of a solution of four parts of toluene and one part of butylalcohol and mixed with 5.3 parts of a stabilised solution of titanium butylate. After heating a coating at 180° C. for 30 minutes a brownish cured film is obtained.

The stabilised solution of titanium butylate is prepared as the ferric butylate of Example 8 by heating 250 parts of titanium butylate with 120 parts of acetylaceton.

*Example 10*

Fifty parts of an epoxide resin are dissolved in fifty parts glycol monoethylether and mixed with 6.2 parts of a stabilised solution of stannic butylate. Films prepared with this solution by heating at 180° C. for 30 minutes are complete cured and hardened.

The stabilised solution of stannic butylate is prepared by heating 200 parts of stannic butylate with 103.8 parts of the ethylester of malonic acid.

Example 11

One hundred parts of an epoxide resin are melted and at ca. 120° C. mixed with 11.2 parts of a solution of the aluminum alcoholate of triethylenglycol in ethyl acetoacetate, the relation of which is one mol of aluminum to 1.5 mol of ethyl acetoacetate. After cooling the solution yields a combination of resin and alcoholate which after curing at 200° C. for 30 minutes yields hard and elastic coatings.

Example 12

Fifty parts of epoxide resin are melted and at ca. 140° C. mixed with 5.7 parts of a solution of aluminum alcoholate of glycol monoethylether in ethyl acetoacetate the relation of which is 1 mol of aluminum to 1.25 mol of ethyl acetoacetate. After baking at 180° C. for 30 minutes coats of the cooled solution yield hardened films of high hardness and elasticity.

Example 13

Two hundred parts of an epoxide resin as in Example 8 are dissolved in 200 parts of glycol monoethylether and mixed with 40 parts of a 50% solution of aluminum octylate in glycol monoethylether. The solution thus obtained has the same properties as the solution produced in Example 8.

Example 14

One hundred parts of an epoxide resin are melted and in molten state mixed with 25 parts of a resin which is prepared by reaction of 1000 parts of aluminum butylate with 530 parts of ethyl acetoacetate. The resin thus obtained yields films with the same valuable properties as the product produced in Example 12.

Example 15

One hundred parts of an epoxide resin in molten state are mixed with 17.5 parts of a resin prepared by reaction of 1000 parts of titanium butylate with 480 parts of the ethylester of malonic acid. After cooling the resin has the same valuable properties as the resin produced in Example 12.

The titanium resin is prepared by heating under reflux 1000 parts of titanium butylate with 480 parts of ethylester of malonic acid and then removing the volatile ingredients by distillating under vacuo.

Example 16

One hundred parts of an epoxide resin in molten state are mixed with 21.3 parts of a resin prepared by reaction of 1000 parts of aluminum butylate with 375 parts of formyl-acetophenone. The resin thus obtained is of brownish color and has the same properties as the resin produced in Example 12.

The aluminum resin is prepared by heating under reflux for 3 to 4 hours 1000 parts of aluminum butylate with 375 parts of formyl-acetophenone and then removing the volatile parts by vacuo distillation at ca. 150° C.

Example 17

One hundred parts of an epoxide resin as in Example 8 are dissolved in 100 parts of glycol monoethylether containing 12.5 parts of a resin prepared by reaction of 1000 parts aluminum butylate with 530 parts of ethyl acetoacetate and blown with air at elevated temperature. After distillation the solution yields a resin with the same valuable properties as the product produced in Example 12.

The aluminum resin is prepared first by heating and refluxing for 3 to 4 hours 1000 parts of aluminum butylate with 530 parts of ethyl acetoacetate. The product thus produced is heated from 160° to 240° C. with stirring and by blowing air through the molten resin. Thus the reaction is finished when the resin is a hard product at normal temperature.

It should be understood that the instant invention is not limited to the specific compounds and procedures herein described, for it extends to all equivalents which will occur to those skilled in the art upon consideration of the scope of the claims appended hereto.

We claim:

1. A process for producing improved epoxide resins which comprises incorporating in said resins as a hardening agent, an alcoholate of a polyvalent metal in a catalytic proportion, said epoxide resins containing free epoxide groups and being derived by the reaction of a polyhydroxy phenol with epichlorhydrin.

2. A heat hardenable epoxide resin containing as a hardening agent an alcoholate of a polyvalent metal in a catalytic proportion, said epoxide resins containing free epoxide groups and being derived by the reaction of a polyhydroxy phenol with epichlorhydrin.

3. A hard, elastic, solvent-resistant, epoxide resin composed of a heat-hardened epoxide resin hardened by the presence of a catalytic proportion of an alcoholate of a polyvalent metal contained in the epoxide resin before hardening, said resin being derived by the reaction of a polyhydroxy phenol with epichlorhydrin.

4. A process for producing improved epoxide resins which comprises incorporating in an epoxide resin containing free epoxide groups and derived by the reaction of a polyhydroxy phenol with epichlorhydrin, a catalytic amount of a hardening agent composed of an alcoholate of a metal selected from the group consisting of cobalt, manganese, zinc, copper, aluminum, iron, titanium and tin alcoholates, the alcoholate radical being of a hydroxy compound selected from the group consisting of the butyl-, amyl-, benzyl-, and cyclohexyl- alcohols, glycol, polyglycol and a glycol monoether.

5. A heat-hardenable epoxide resin containing as a hardening agent a catalytic amount of an alcoholate of a metal selected from the group consisting of cobalt, manganese, zinc, copper, aluminum, iron, titanium and tin alcoholates, the alcoholate radical being of a hydroxy compound selected from the group consisting of the butyl-, amyl-, benzyl-, and cyclohexyl- alcohols, glycol, polyglycol and a glycol monoether, said epoxide resin containing free epoxide groups and being derived by the reaction of a polyhydroxy phenol with epichlorhydrin.

6. A process for producing improved epoxide resins which comprises incorporating in said resins as a hardening agent an alcoholate of a polyvalent metal in a catalytic proportion, dissolved in a ketonic solvent selected from the group consisting of beta-keto-carboxylic esters and beta-diketones, the epoxide resins containing free epoxide groups and being derived by the reaction of a polyhydroxy phenol with epichlorhydrin.

7. A process for producing improved epoxide resins which comprises incorporating in said resins as a hardening agent, an alcoholate of a polyvalent metal in the form of an alkoxo salt derivative thereof in a catalytic proportion, said derivative being a polyvalent metal salt of an acid of the formula $Al(OR)_4H$ where R is an alkyl radical, said epoxide resins containing free epoxide groups and being derived by the reaction of a polyhydroxy phenol with epichlorhydrin.

8. A process for producing improved epoxide resins which comprises incorporating in said resins as a hardening agent and in a catalytic proportion, an alcoholate of a polyvalent metal in the form of a solution of an alkoxo salt derivative thereof, said derivative being a polyvalent metal salt of an acid of the formula $Al(OR)_4H$ where R is an alkyl radical, the epoxide resins containing free epoxide groups and being derived by the reaction of a polyhydroxy phenol with epichlorhydrin.

9. A process for producing improved epoxide resins which comprises incorporating in said resins as a hardening agent and in a catalytic proportion, an alcoholate of a polyvalent metal in the form of a synthetic resin selected from the group consisting of unoxidized and oxidized resins, both prepared by the reaction of an alcoholate of a polyvalent metal with a compound of tautomeric reaction as to the presence of enolic and ketonic hydroxyl groups, the oxidized resins having been treated with atmospheric oxygen at elevated temperature, and the epoxide resins containing free epoxide groups at the time the alcoholate resin is incorporated therein and being derived by the reaction of a polyhydroxy phenol with epichlorhydrin.

10. A heat-hardenable intermediate thermoplastic epoxide resin having free epoxide groups, containing as a curing and hardening agent and in a catalytic proportion, an alcoholate of a polyvalent metal capable of forming complex salts, the epoxide resin being derived by the reaction of a polyhydroxy phenol with epichlorhydrin.

References Cited in the file of this patent
UNITED STATES PATENTS 2,582,985     Greenlee _____ Jan. 22, 1952